(12) United States Patent
Iwai et al.

(10) Patent No.: US 9,155,024 B2
(45) Date of Patent: Oct. 6, 2015

(54) RADIO TRANSMITTING APPARATUS, RADIO RECEIVING APPARATUS, AND PILOT GENERATING METHOD

(75) Inventors: Takashi Iwai, Ishikawa (JP); Sadaki Futagi, Ishikawa (JP); Tomofumi Takata, Ishikawa (JP); Daichi Imamura, Kanagawa (JP); Atsushi Matsumoto, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 2029 days.

(21) Appl. No.: 12/306,218

(22) PCT Filed: Jun. 22, 2007

(86) PCT No.: PCT/JP2007/062621
§ 371 (c)(1),
(2), (4) Date: Dec. 22, 2008

(87) PCT Pub. No.: WO2007/148796
PCT Pub. Date: Dec. 27, 2007

(65) Prior Publication Data
US 2009/0285327 A1    Nov. 19, 2009

(30) Foreign Application Priority Data

Jun. 23, 2006   (JP) ................. 2006-174485

(51) Int. Cl.
*H04K 1/10* (2006.01)
*H04B 1/56* (2006.01)
*G01V 3/00* (2006.01)
(Continued)

(52) U.S. Cl.
CPC ............ *H04W 48/08* (2013.01); *H04L 25/0226* (2013.01); *H04L 27/2602* (2013.01); *H04L 27/2607* (2013.01); *H04L 27/2613* (2013.01); *H04L 5/0007* (2013.01); *H04L 25/0228* (2013.01); *H04L 25/0232* (2013.01); *H04L 25/03159* (2013.01)

(58) Field of Classification Search
USPC .......................................... 375/260; 370/276
See application file for complete search history.

(56) References Cited

U.S. PATENT DOCUMENTS 6,240,129 B1 *  5/2001  Reusens et al. ............... 375/222
6,442,173 B1 *  8/2002  Barsoum et al. .............. 370/445
(Continued)

FOREIGN PATENT DOCUMENTS

| | | |
|---|---|---|
| JP | 2000-324020 | 11/2000 |
| JP | 2003-338775 | 11/2003 |
| WO | 2006/006238 | 1/2006 |

OTHER PUBLICATIONS

International Search Report dated Sep. 4, 2007.
(Continued)

*Primary Examiner* — Leon-Viet Nguyen
*Assistant Examiner* — Sarah Hassan
(74) *Attorney, Agent, or Firm* — Dickinson Wright PLLC

(57) ABSTRACT

A radio transmitter and so forth capable of improving the precision of frequency domain equalization while transmitting a longer pilot sequence. In a series of pilot blocks generated from one pilot sequence with the same length as a data sequence such as a CAZAC sequence, the transmitter defines the rear end of each pilot block as the cyclic prefix of the next pilot block and defines the rear end of the last pilot block as the cyclic prefix of the first pilot block.

2 Claims, 23 Drawing Sheets

(51) Int. Cl.
*H04W 48/08* (2009.01)
*H04L 27/26* (2006.01)
*H04L 25/02* (2006.01)
*H04L 5/00* (2006.01)
*H04L 25/03* (2006.01)

(56) References Cited

U.S. PATENT DOCUMENTS

| | | | |
|---|---|---|---|
| 6,804,311 B1 | 10/2004 | Dabak | |
| 6,842,487 B1* | 1/2005 | Larsson | 375/260 |
| 2001/0004387 A1* | 6/2001 | Barkar | 375/257 |
| 2002/0010870 A1* | 1/2002 | Gardner | 713/300 |
| 2002/0126768 A1* | 9/2002 | Isaksson et al. | 375/298 |
| 2002/0176485 A1* | 11/2002 | Hudson | 375/144 |
| 2003/0165113 A1* | 9/2003 | Hudson | 370/208 |
| 2004/0013084 A1* | 1/2004 | Thomas et al. | 370/210 |
| 2004/0131007 A1* | 7/2004 | Smee et al. | 370/208 |
| 2004/0165650 A1* | 8/2004 | Miyazaki et al. | 375/141 |
| 2005/0046592 A1* | 3/2005 | Cooper et al. | 340/855.7 |
| 2005/0068886 A1* | 3/2005 | Wang et al. | 370/210 |
| 2005/0176436 A1* | 8/2005 | Mantravadi et al. | 455/450 |
| 2006/0120468 A1* | 6/2006 | Lin et al. | 375/260 |
| 2006/0239367 A1* | 10/2006 | Wilhelmsson et al. | 375/260 |
| 2006/0245472 A1* | 11/2006 | Pan et al. | 375/144 |
| 2007/0133393 A1 | 6/2007 | Bocquet | |
| 2008/0002645 A1* | 1/2008 | Seki et al. | 370/338 |
| 2008/0025423 A1* | 1/2008 | Wang et al. | 375/260 |

OTHER PUBLICATIONS

3GPP TSG RAN WG1 Ad Hoc on LTE, R1-050822, Texas Instruments, Sep. 2005, Internet<URL:http://www.3gpp.org/ftp/tsg_ran/WG1_RL1/TSGR1_42/Docs/R1-050822.zip>.

3GPP TSG RAN WG1 Meeting #44bis, R1-060831, NEC Group, Mar. 2006,Internet<URL:http://www.3gpp.org/ftp/tsg_ran/WG1_RL1/TSGR1_44bis/Docs/R1-060831.zip>.

3GPP TSG RAN WG1 Meeting #47 R1-063128, Nov. 2006, Ericsson, Internet<URL:http://www.3gpp.org/ftp/tsg_ran/WG1_RL1/TSGR1_47/Docs/R1-063128.zip>.

3GPP TR 25.814 v7.0.0 Jun. 2006, Physical Layer Aspects for Evolved Universal Terrestrial Radio /Access (UTRA), (Release 7), pp. 1-126. p. 3.

Japanese Notice of Reasons for Rejection dated Aug. 23, 2011.

* cited by examiner

PRIOR ART FIG.7A
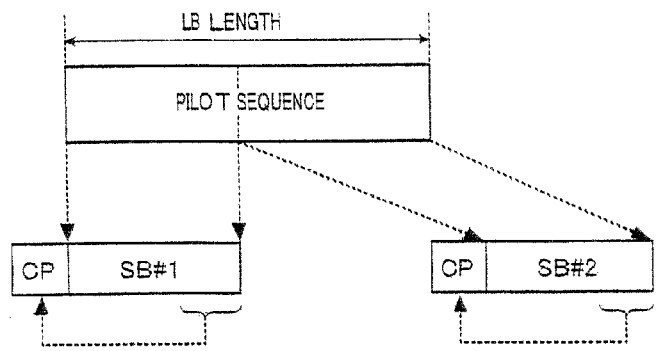
PRIOR ART FIG.7B
PRIOR ART FIG.7C
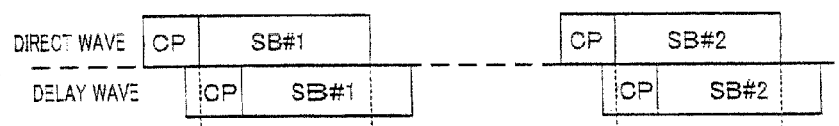
PRIOR ART FIG.7D
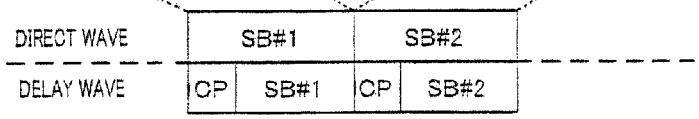

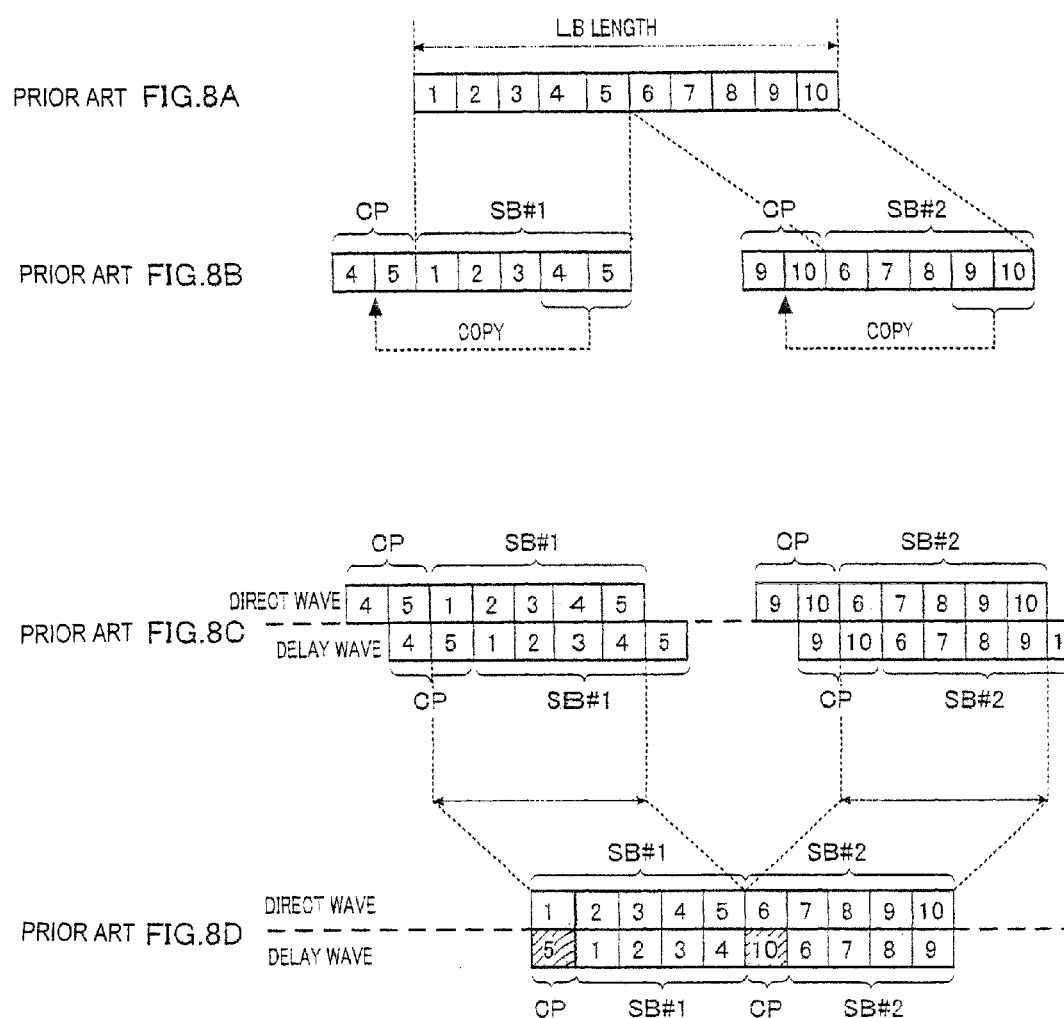

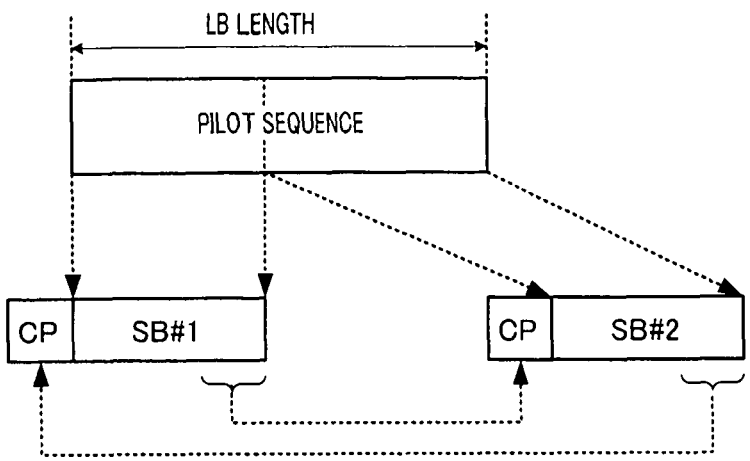
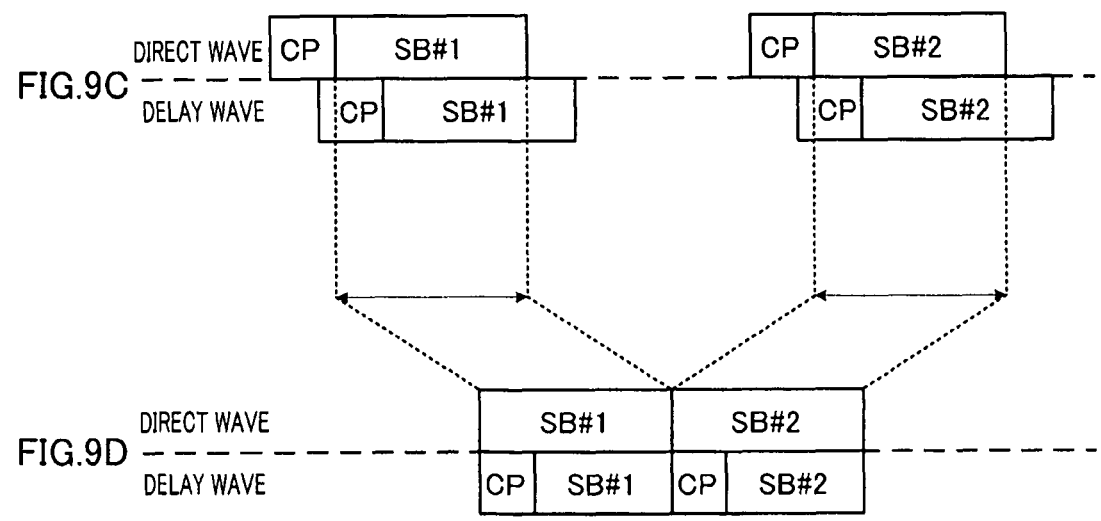

RADIO TRANSMITTING APPARATUS, RADIO RECEIVING APPARATUS, AND PILOT GENERATING METHOD

TECHNICAL FIELD

The present invention relates to a radio transmitting apparatus, radio receiving apparatus and pilot generating method.

BACKGROUND ART

Up till now, in 3GPP RAN LTE (Long Term Evolution), studies are underway for single carrier with frequency domain equalization ("SC-FDE") in the uplink and downlink. In a communication system for performing SC-FDE, to prevent inter-block interference due to multipath, as shown in FIG. 1, a signal is generated by attaching part of the tail end portion of the data block to be transmitted, to the head of that data block as a cyclic prefix ("CP"). Signals generated as above are transmitted from the transmitting side, and the direct waves and delay waves are combined on the channel and arrive at the receiving side. The receiving side performs timing synchronization processing on the received signal, removes the CP part and extracts a signal of one block length from the head of the direct wave block without a CP. The extracted signal is demodulated by performing equalization processing (frequency domain equalization) on the wave distortion in the frequency domain.

To be more specific, in 3GPP RAN LTE, studies are underway for, in the uplink, performing an SC-FDE using the transmission format shown in FIG. 2 (e.g., see Non-Patent Document 1). In the transmission format shown in FIG. 2, one subframe is comprised of two blocks of different block lengths, namely, long blocks ("LBs") and short blocks ("SBs"). Here, an example case will be explained where one subframe is comprised of six LBs (LB #1 to LB #6) and two SBs (SB #1 and SB #2). The LB length is twice as long as the SB length. Here, data sequences are mapped in LBs and pilot sequences for data demodulation are mapped in SBs. That is, the length of a pilot sequence is the same as the SB length. As shown in FIG. 2, part of the tail end portion of each LB is copied and attached to the head of that LB as a CP. Further, part of the tail end portion of each SB is copied and attached to the head of that SB as a CP.

FIG. 3 illustrates the transmission format shown in FIG. 2 in detail. With FIG. 3, a method of transmitting pilot sequences in the transmission apparatus and a method of calculating channel estimation values for data demodulation based on the pilot sequences in the receiving apparatus, will be explained. As described above, the length of a pilot sequence to be transmitted in the transmitting apparatus is the same as the SB length, and an SB-length pilot sequence is mapped in SB #1 and SB #2 in one subframe. Further, part of the tail end portion of SB #1 and SB #2 is copied and attached to the head of SB #1 and SB #2, as a CP. The SB length is shorter than the LB length (in this case, the LB length is twice as long as the SB length). Consequently, as shown in FIG. 4, upon calculating channel estimation values in the receiving apparatus, the subcarrier intervals in the pilot sequence mapped in the SB ($\Delta f\_pilot$) are greater than the subcarrier intervals in the data sequence mapped in the LB ($\Delta f\_data$) (here, $\Delta f\_pilot = 2 \times \Delta f\_data$). Therefore, the channel estimation value calculated from the subcarrier intervals in the pilot sequence needs to be interpolated in the frequency domain to calculate the channel estimation value associated with the subcarrier intervals of the data sequence.

Non-Patent Document 1: 3GPP TR25.814 V7.0.0 (2006-06)

DISCLOSURE OF INVENTION

Problem to be Solved by the Invention

However, in cases where frequency selective fading is significant or where the distributed FDMA scheme is used, the subcarrier intervals in the pilot sequence become greater. Consequently, there is a problem that, with the above-noted pilot sequence transmitting method and channel estimation value calculating method, the accuracy of channel estimation value interpolation degrades in the frequency domain and received performances degrade. The reason for this degradation of the accuracy of channel estimation value interpolation in the frequency domain is that the correlation bandwidth is narrower than the subcarrier interval in the pilot sequence, and, consequently, the phase fluctuation and amplitude fluctuation of channel estimation values become greater in the subcarrier intervals in the pilot sequence.

To prevent the degradation of the accuracy of channel estimation value interpolation in the frequency domain due to the difference between the subcarrier interval in a pilot sequence and the subcarrier interval in a data sequence, coordinating the block length of the pilot block with the block length of the data block is possible. To be more specific, as shown in FIG. 5, it is possible to make pilot blocks LBs in accordance with data blocks keeping the number of pilot blocks included in one subframe. However, with such a transmission format, there are excessive pilots and therefore the overhead of pilots increases, which deteriorates the data transmission rate by an increment of the overhead.

Here, to reduce the overhead of pilots, as shown in FIG. 6, it is possible to include a single LB-length pilot block in one subframe. However, with such a transmission format, fading fluctuation in the time domain cannot be followed due to a decrease of the number of pilot blocks in one subframe, and, as a result, the accuracy of channel estimation degrades.

To be responsive to fading fluctuation in the time domain while making equal the subcarrier interval in a pilot sequence and the subcarrier interval in a data sequence, as shown in FIGS. 7A and 7B, it is possible to make the pilot sequence length and data sequence length the same (i.e., LB length), and divide the LB-length pilot sequence into SB #1 and SB #2 and transmit the results. FIG. 7A illustrates an LB-length pilot sequence. FIG. 7B shows a case where the LB-length pilot sequence is divided into SB #1 and SB #2 and a CP is attached to the head of SB #1 and SB #2.

FIG. 7C illustrates received signals in a case where SB #1 and SB #2 with a CP are received on the receiving side via multipath. In FIG. 7C, SB #1 and SB #2 above the dotted line show the direct waves, and SB #1 and SB #2 below the dotted line show the delay waves.

Further, FIG. 7D illustrates an LB-length pilot sequence acquired by extracting and combining signals of an SB length from the head of SB #1 and SB #2 of the direct waves on the receiving side after the CPs of the direct waves shown in FIG. 7C are removed.

FIGS. 8A to 8D show above-noted FIGS. 7A to 7D in further detail. FIGS. 8A to 8D show example cases where an LB-length pilot sequence is comprised of ten bits and the bits of the pilot sequence are represented by numbers between "1" and "10."

FIG. 8A illustrates an LB-length pilot sequence comprised of ten bits between "1" and "10."

FIG. 8B illustrates SB #1 and SB #2 acquired by dividing the LB-length pilot sequence comprised of ten bits into two.

Here, SB #1 is comprised of five bits between "1" and "5" and SB #2 is comprised of five bits between "6" and "10." Further, part of the tail end portion of SB #1, that is, two bits of "4" and "5" are copied to the head of SB #1 as a CP, and part of the tail end portion of SB #2, that is, two bits of "9" and "10" are copied to the head of SB #2 as a CP.

FIG. 8C illustrates received signals in a case where SB #1 and SB #2 with a CP are received on the receiving side via multipath. In FIG. 8C, SB #1 and SB #2 above the dotted line show the direct waves and SB #1 and SB #2 below the dotted line show the delay waves. Further, FIG. 8C shows an example case where the delay waves are one bit behind the direct waves.

FIG. 8D shows a pilot sequence of ten bits acquired by extracting and combining signals of the SB-length, namely, five bits from the head of SB #1 and SB #2 of the direct waves on the receiving side after the CPs of the direct waves shown in FIG. 8C are removed. As shown in FIG. 8D, while the direct waves are comprised of consecutive ten bits "1" to "10," the delay waves are comprised of inconsecutive ten bits of "5," "1," "2," "3," "4," "10," "6," "7," "8" and "9," where delay waves are inconsecutive in "5" and "10".

Further, if the receiving side performs FFT (Fast Fourier Transform) processing, frequency domain equalization processing and demodulation processing using such an inconsecutive pilot sequence, the accuracy of channel estimation and received performances degrade.

It is therefore an object of the present invention to provide a radio transmitting apparatus, radio receiving apparatus and pilot generating method for solving the above-noted problem and improving the accuracy of channel estimation and received performances.

Means for Solving the Problem

The radio transmitting apparatus of the present invention employs a configuration having: a generating section that generates a series of a plurality of pilot blocks from a single pilot sequence; and a transmitting section that transmits the plurality of pilot blocks, and in which, in the series of the plurality of pilot blocks, the generating section cyclically makes tail end portions of the pilot blocks cyclic prefixes of different pilot blocks.

Advantageous Effect of the Invention

According to the present invention, it is possible to improve the accuracy of channel estimation and received performances.

BRIEF DESCRIPTION OF DRAWINGS

FIG. 7 illustrates a conventional transmission format in which delay waves are inconsecutive;
FIG. 8 illustrates a conventional transmission format in which delay waves are inconsecutive in detail;
FIG. 9 illustrates an operational principle of the present invention.

BEST MODE FOR CARRYING OUT THE INVENTION

Figure 1:
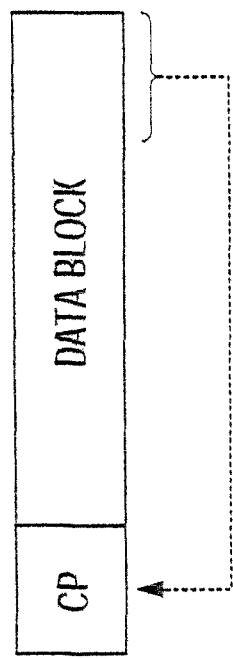
FIG. 1 illustrates a conventional method of attaching a CP.
Figure 2:
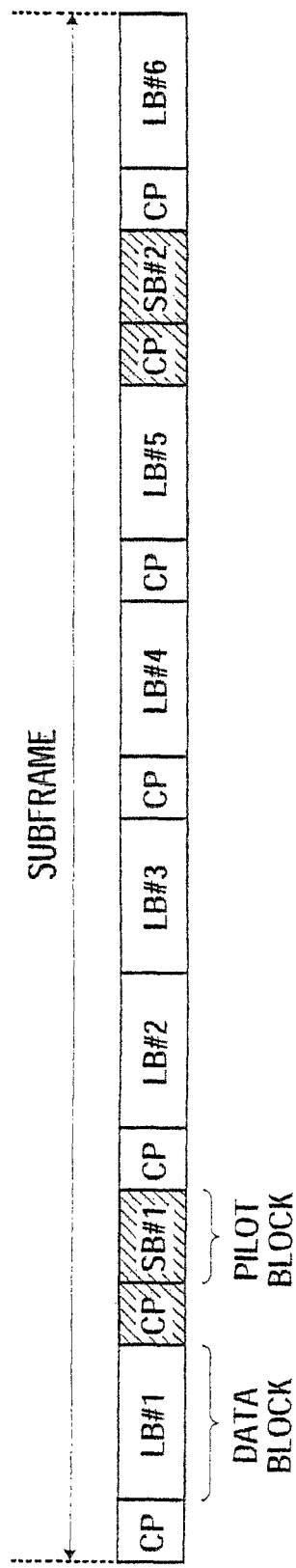
FIG. 2 illustrates a transmission format in the uplink in 3GPP RAN LTE.
Figure 3:
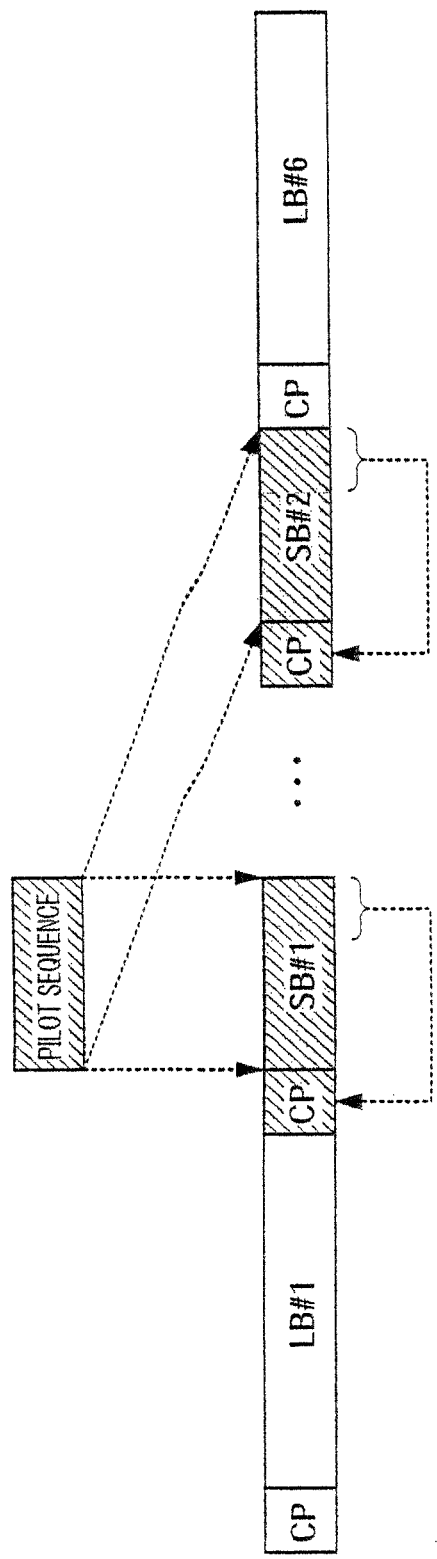
FIG. 3 illustrates a transmission format in the uplink in 3GPP RAN LTE in detail.
Figure 4:
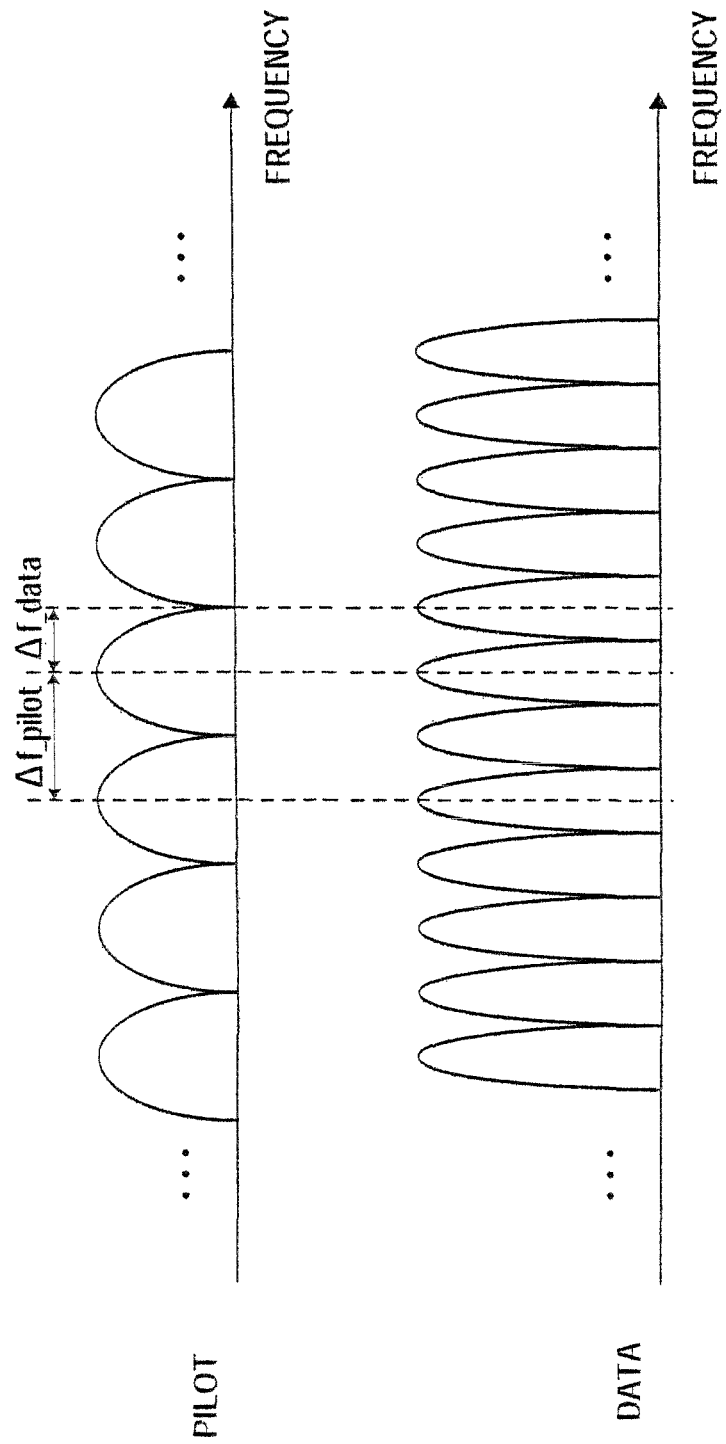
FIG. 4 illustrates conventional channel estimation interpolation in the frequency domain.
Figure 5:
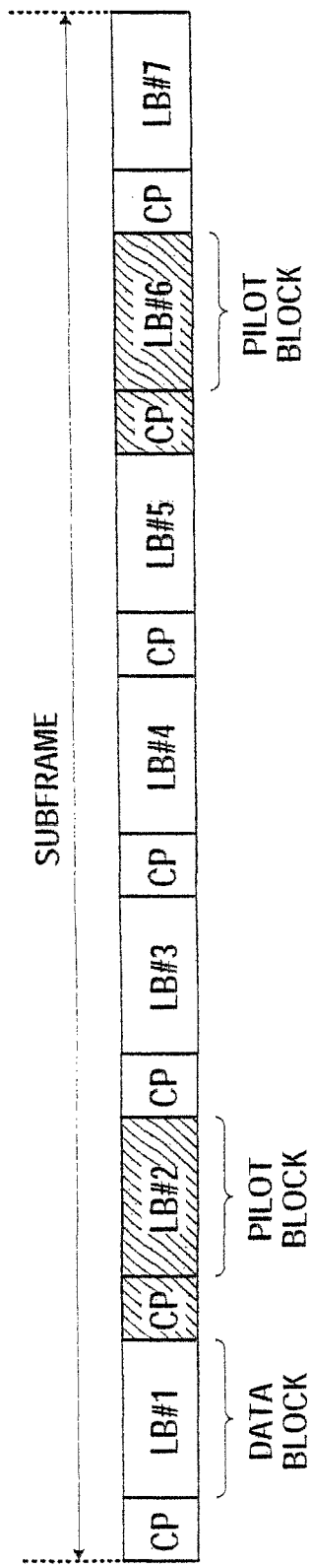
FIG. 5 illustrates a conventional transmission format when there are excess pilots.
Figure 6:
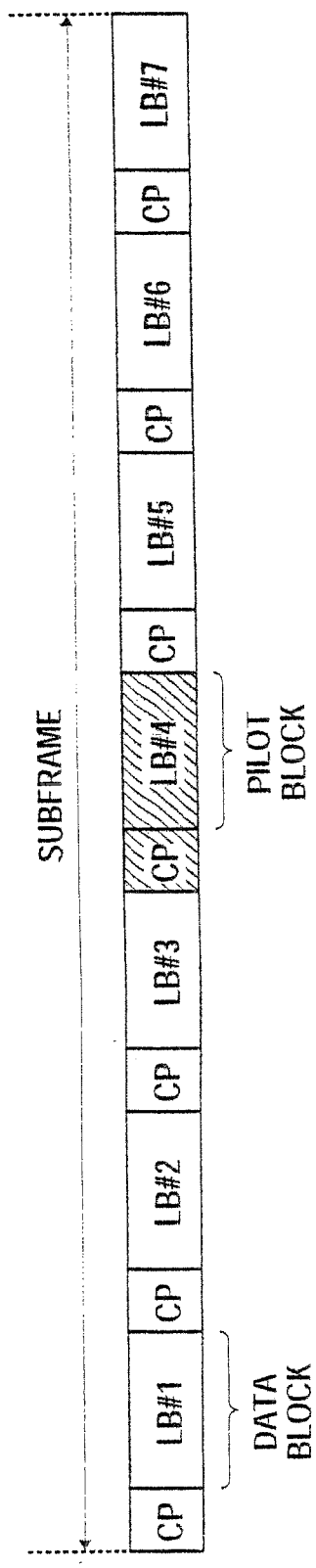
FIG. 6 illustrates a conventional transmission format including a single pilot block of the LB-length in one subframe.

First, the operational principle of the present invention will be explained using FIG. 9. In the following explanations, an example case will be explained where a data block is an LB, using the transmission format in the uplink in 3GPP RAN LTE as shown in FIG. 2 as an example.

In the present invention, a series of a plurality of pilot blocks in which the tail end portions of the pilot blocks are cyclically made CPs of different pilot blocks, are generated from a single pilot sequence. That is, according to the present invention, in a series of a plurality of pilots generated from a single pilot sequence, the tail end portion of each pilot block is made a CP of the next pilot block, and the tail end portion of the last pilot block is made a CP of the first pilot block.

To be more specific, according to the present invention, as shown in FIGS. 9A and 9B, in a series of a plurality of pilot blocks SB #1 and SB #2 generated from a single LB-length pilot sequence, the tail end portion of SB #1 is made the CP of SB #2 and the tail end portion of SB #2 is made the CP of SB #1.

FIG. 9C illustrates received signals in a case where the SB #1 and SB #2 with a CP shown in FIG. 9B are received on the receiving side via multipath. In FIG. 9C, the SB #1 and SB #2 above the dotted line show the direct waves and the SB #1 and SB #2 below the dotted line show the delay waves.

Further, FIG. 9D shows an LB-length pilot sequence acquired by extracting and combining signals of an SB length from the head of direct waves of SB #1 and SB #2 on the receiving side after the CPs of direct waves shown in FIG. 9C are removed.

FIGS. 10A to 10D illustrates above-noted FIGS. 9A to 9D in detail. In FIGS. 10A to 10D, as described above, an example case will be explained where an LB-length pilot sequence is comprised of ten bits and the bits of the pilot sequence are represented by numbers between "1" and "10."

Figure 10A:
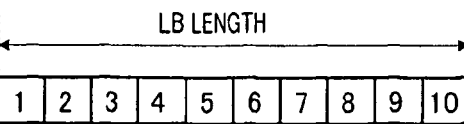
FIG. 10 illustrates an operational principle of the present invention in detail.

FIG. 10A illustrates an LB-length pilot sequence comprised of ten bits between "1" and "10."

Figure 10B:
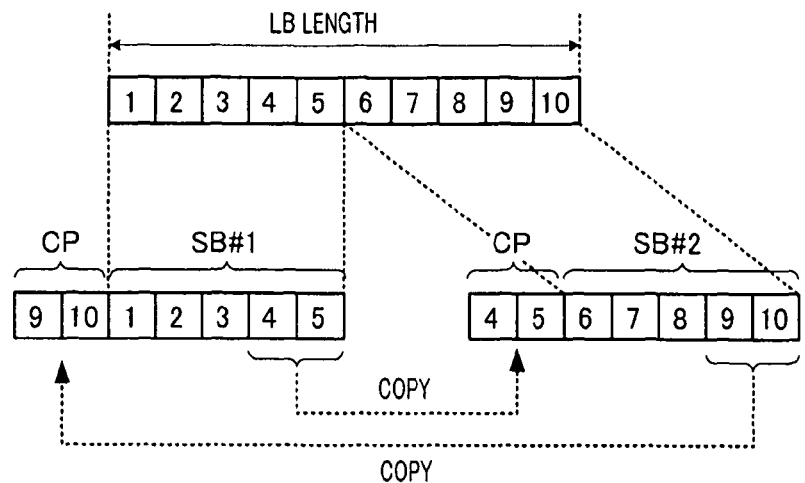

FIG. 10B illustrates SB #1 and SB #2 acquired by dividing the LB-length pilot sequence of ten bits into two. Here, SB #1 is comprised of five bits between "1" and "5" and SB #2 is comprised of five bits between "6" and "10." Further, the tail end portion of SB #1, that is, two bits of "4", and "5" are copied to the head of SB #1 as a CP, and the tail end portion of SB #2, that is, two bits of "9" and "10" are copied to the head of SB #2 as a CP.

Figure 10C:
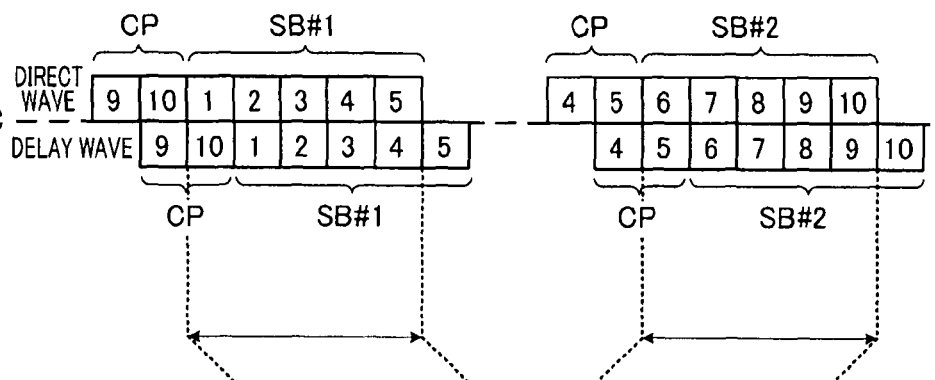

FIG. 10C illustrates received signals in a case where SB #1 and SB #2 are received on the receiving side via multipath. In FIG. 10C, the SB #1 and SB #2 above the dotted line show the direct waves and the SB #1 and SB #2 below the dotted line show the delay waves. As described above, FIG. 10C shows an example case where the delay waves are one bit behind the direct wave.

Figure 10D:
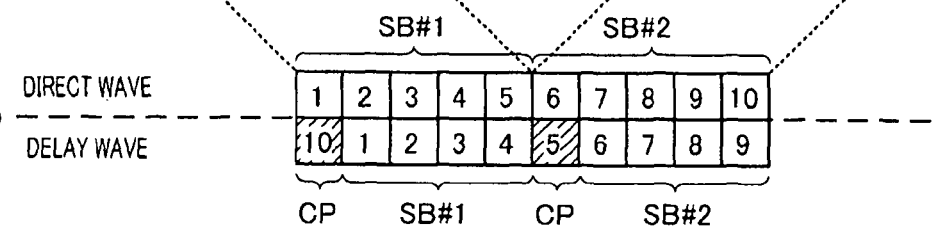

FIG. 10D shows a pilot sequence of ten bits acquired by, after the CPs of direct waves shown in FIG. 10C are removed, extracting and combining signals of the SB-length of five bits based on the heads of direct waves of SB #1 and SB #2 on the receiving side. As shown in FIG. 10D, while the direct waves are comprised of consecutive ten bits "1" to "10," the delay waves are comprised of consecutive ten bits "10," "1," "2," "3," "4," "5," "6," "7," "8" and "9."

Embodiments of the present invention according to the above-noted operational principle will be explained below in detail with reference to the accompanying drawings.

(Embodiment 1)

Figure 11:
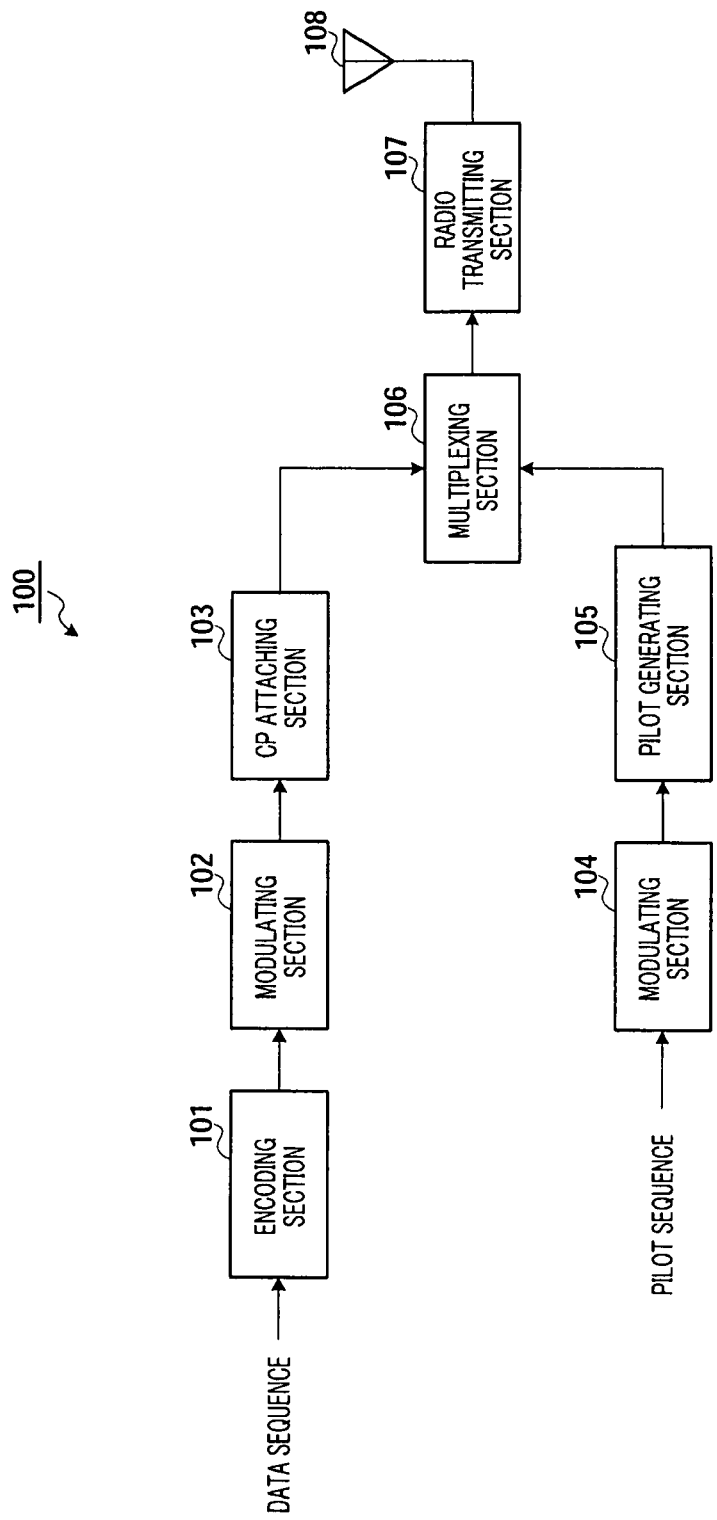
FIG. 11 is a block diagram showing a configuration of a radio transmitting apparatus according to Embodiment 1 of the present invention.

FIG. 11 is a block diagram showing the configuration of radio transmitting apparatus 100 according to Embodiment 1 of the present invention.

Encoding section 101 performs error correcting encoding such as turbo encoding for the data sequence inputted per LB-length block, and outputs the results to modulating section 102.

Modulating section 102 performs modulation processing such as PSK (Phase Shift Keying) modulation and QAM (Quadrature Amplitude Modulation) modulation for the data sequence after error correcting encoding, and outputs the result to CP attaching section 103.

CP attaching section 103 attaches the tail end portion of the modulated data sequence to its head and outputs the result to multiplexing section 106.

On the other hand, modulating section 104 performs modulation processing such as PSK modulation and QAM modulation for a pilot sequence of an LB length that is the same as the data block, and outputs the result to pilot generating section 105.

Pilot generating section 105 generates from the modulated LB-length pilot sequence, a series of a plurality of pilot blocks in which the tail end portions of pilot blocks are cyclically made the CPs of different pilot blocks, and outputs the result to multiplexing section 106. The internal configuration and detailed operations of pilot generating section 105 will be described later.

Multiplexing section 106 time-multiplexes a plurality of data sequences with a CP inputted from CP attaching section 103 and the plurality of pilot blocks with a CP inputted from pilot generating section 105, and outputs the resulting multiplexed signal to radio transmitting section 107.

Radio transmitting section 107 performs radio transmission processing such as D/A conversion, amplification and up-conversion for the multiplexed signal and transmits the result via transmission antenna 108.

The internal configuration and detailed operations of pilot generating section 105 will be explained below using two pilot generation examples. Cases will be explained in the following pilot generation examples where, in a series of a plurality of pilot blocks generated from a single pilot sequence, the tail end portions of the pilot blocks are cyclically made the CPs of different pilot blocks. That is, cases will be explained in the following pilot generation examples where, in a series of a plurality of pilots generated from a single pilot sequence, the tail end portion of each pilot block is made a CP of the next pilot block, and the tail end portion of the last pilot block is made a CP of the first pilot block as a CP.

(Pilot Generation Example 1)

In the present generation example, pilot generating section 105 divides a single LB-length pilot sequence into a series of a plurality of SB-length pilot blocks, attaches the tail end portion of each pilot block to the next pilot block as a CP and attaches the tail end portion of the last pilot block to the first pilot block as a CP.

Figure 12:
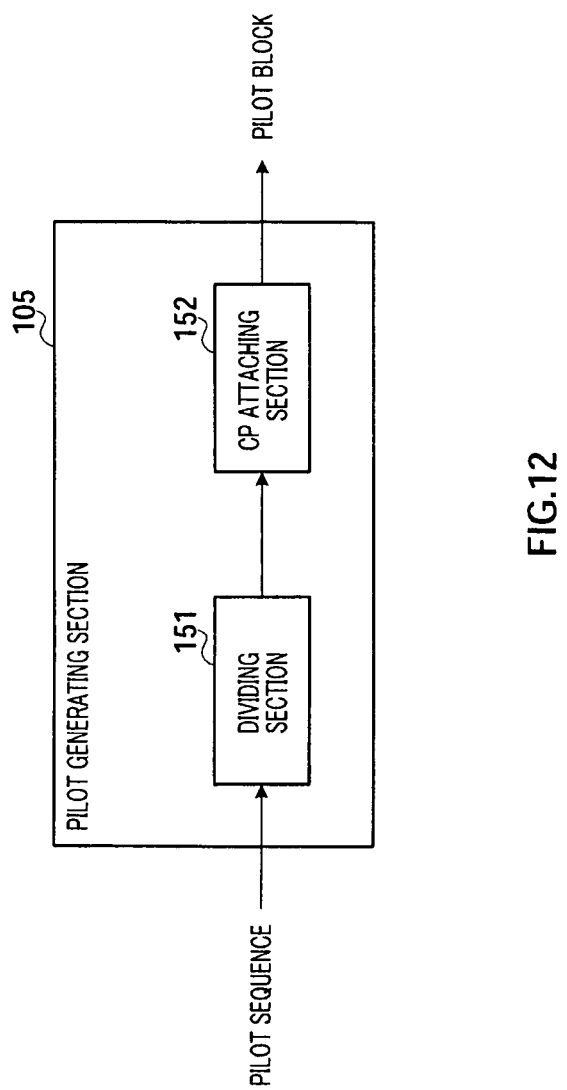
FIG. 12 is a block diagram showing an internal configuration of a pilot generating section according to pilot generation example 1.

FIG. 12 is a block diagram showing the internal configuration of pilot generating section 105 according to pilot generation example 1.

As shown in FIG. 12, pilot generating section 105 according to the present generation example is configured with dividing section 151 and CP attaching section 152.

Dividing section 151 divides a modulated LB-length pilot sequence into the series of a plurality of SB-length pilot blocks and outputs the results to CP attaching section 152.

CP attaching section 152 attaches a CP to the head of each divided pilot block and outputs the results to multiplexing section 106.

Figure 13:
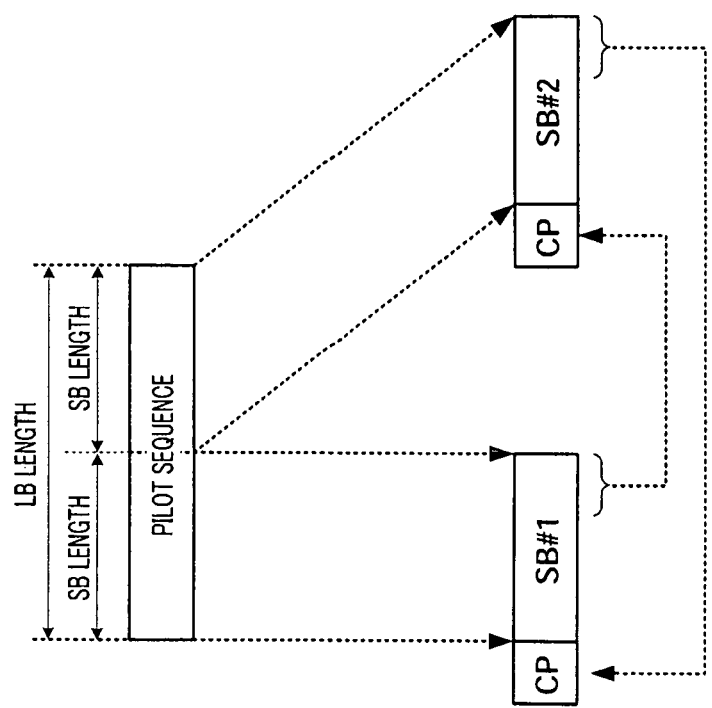
FIG. 13 illustrates an operation of a pilot generating section according to pilot generation example 1.

FIG. 13 illustrates the operations of pilot generating section 105 shown in FIG. 12. In this figure, an example case will be explained where pilot generating section 105 divides a single LB-length pilot sequence into two SB-length pilot blocks.

As shown in FIG. 13, the length of a pilot sequence inputted to dividing section 151 is an LB length. Dividing section 151 divides the inputted LB-length pilot sequence into SB-length pilot sequences of SB #1 and SB #2, and outputs the results to CP attaching section 152. CP attaching section 152 attaches the tail end portion of pilot block SB #1 to the head of pilot block SB #2 as a CP and attaches the tail end portion of pilot block S #2 to the head of pilot block SB #1 as a CP. By this means, pilot block SB #1 and pilot block #2 with a CP attached to their head are acquired.

Figure 14:
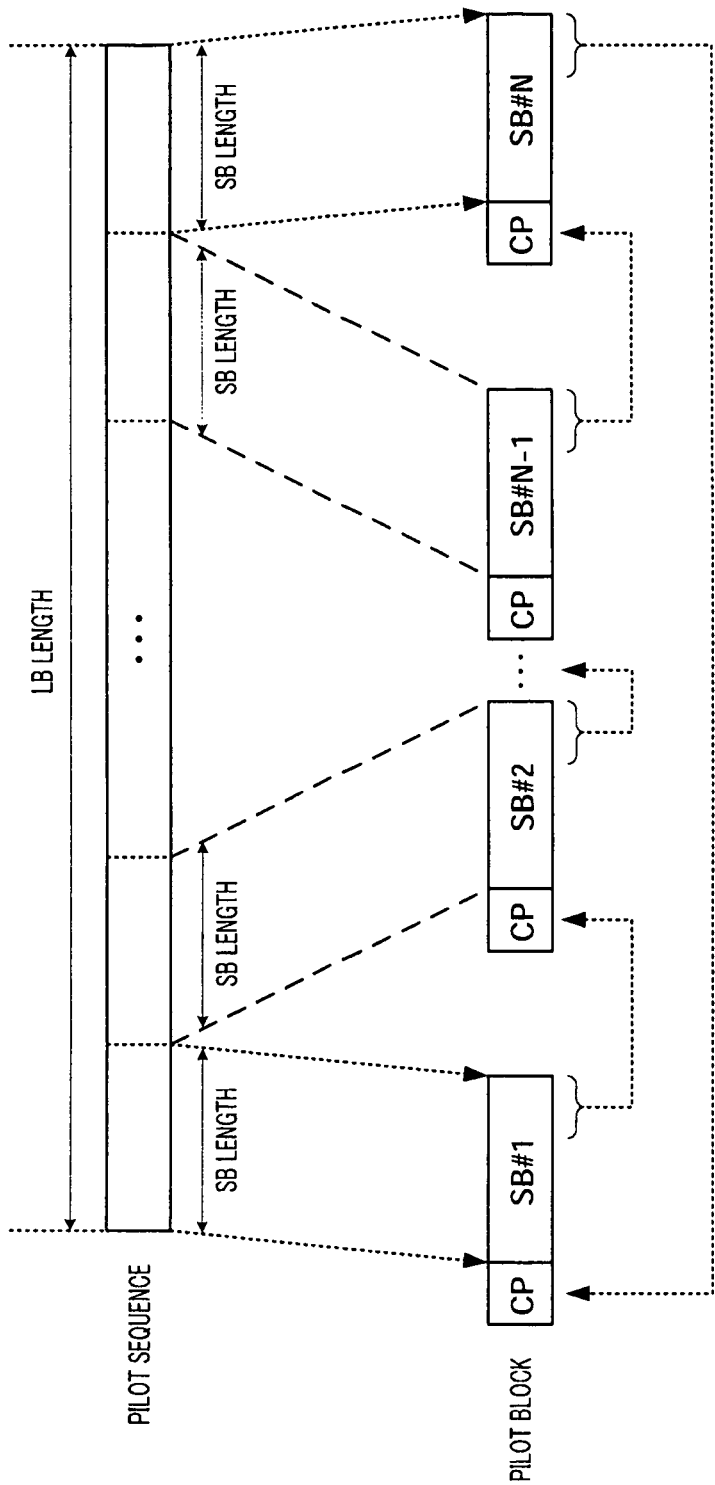
FIG. 14 shows a case where a single LB-length pilot sequence is divided into a plurality of SB-length pilot blocks.

Further, FIG. 14 shows a case where a single LB-length pilot sequence is divided into a plurality (N) of SB-length pilot sequences.

That is, dividing section 151 divides the inputted LB-length pilot sequences into N SB-length pilot blocks SB #1, SB #2, . . . , SB #(N−1) and SB #N, and CP attaching section 152 attaches the tail end portion of each pilot block in order from pilot block SB #1, to the head of the next pilot block as a CP. In short, CP attaching section 152 attaches the tail end portion of pilot block SB #n (where n is an integral greater than 0) to the head of pilot block SB #(n+1) as a CP.

Further, CP attaching section 152 attaches the tail end portion of the last pilot block SB #N to the head of the first pilot block SB #1 as a CP.

(Pilot Generation Example 2)

In the present example, first, pilot generating section 105 generates a signal sequence generated by attaching the tail end portion of a single LB-length pilot sequence to the head of the pilot sequence. Next, from the positions of SB-length intervals from the head of the generated signal sequence as starting points, a plurality of blocks having the length adding the CP length and the SB-length are extracted. The plurality of blocks extracted as above represent a series of a plurality of SB-length pilot blocks with CPs attached to their heads.

Figure 15:
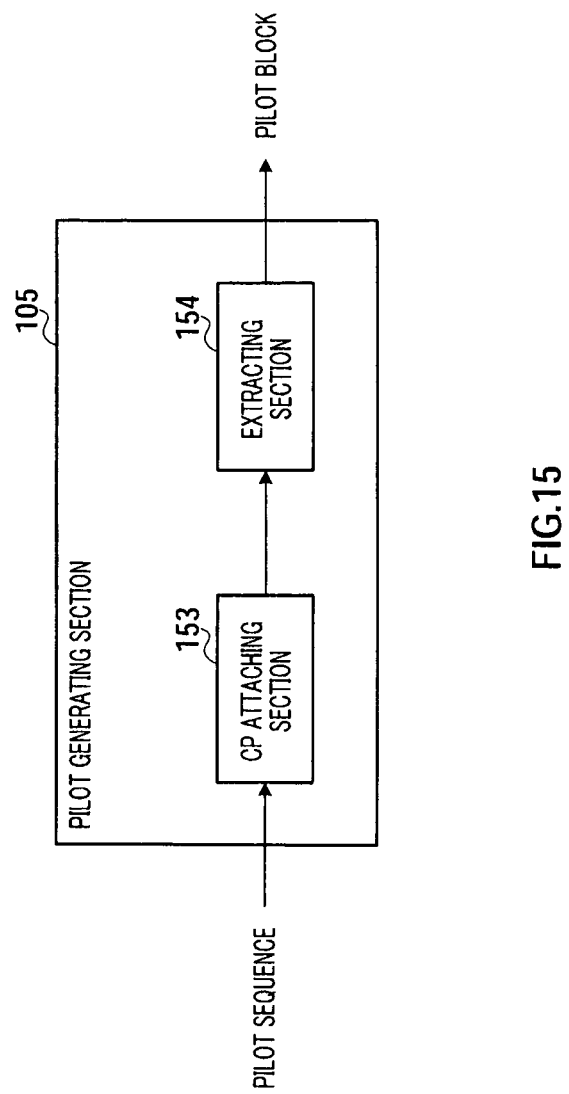
FIG. 15 is a block diagram showing an internal configuration of a pilot generating section according to pilot generation example 2.

FIG. 15 is a block diagram showing the internal configuration of pilot generating section 105 according to pilot generation example 2.

As shown in FIG. 15, pilot generating section 105 according to the present generation example is configured with CP attaching section 153 and extracting section 154.

CP attaching section 153 attaches the tail end portion of a modulated LB-length pilot sequence to its head, and outputs the acquired signal sequence to extracting section 154.

Extracting section 154 extracts a series of a plurality of SB-length pilot blocks with CPs attached to their heads, from the signal sequence inputted from CP attaching section 153, and outputs the extracted pilot blocks to multiplexing section 106.

Figure 16:
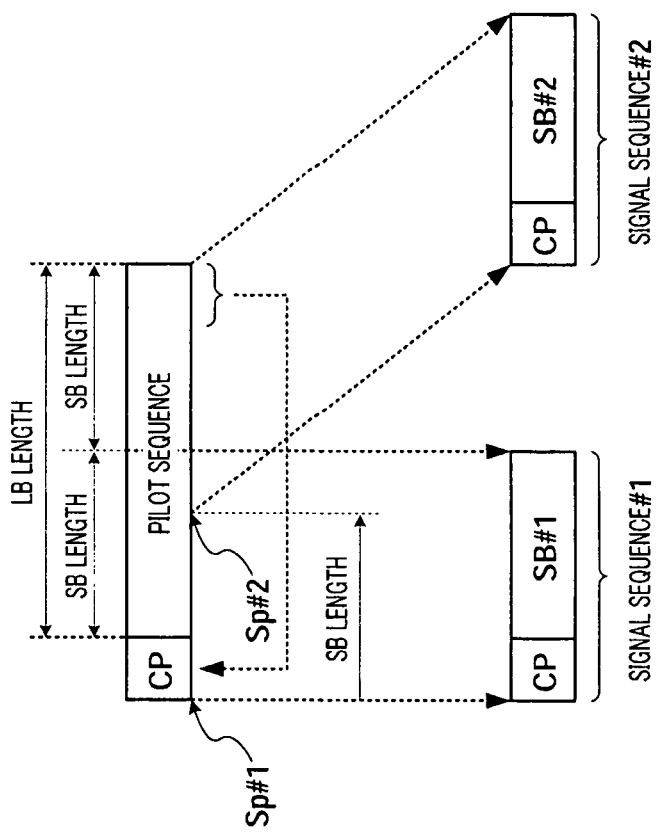
FIG. 16 illustrates an operation of pilot generating section according to pilot generation example 2.

FIG. 16 illustrates the operations of pilot generating section 105 shown in FIG. 15. An example case will be explained below with this figure where pilot generating section 105 extracts two SB-length pilot blocks from a single LB-length pilot sequence.

As shown in FIG. 16, the length of the pilot sequence inputted from CP attaching section 153 is the LB-length. CP attaching section 153 generates a signal sequence in which the tail end portion of the inputted LB-length pilot sequence is attached to its head as a CP. Extracting section 154 determines the head of the signal sequence as the first starting point Sp #1 and determines the position of an SB length interval from the head as the next starting point Sp #2. Further, extracting section 154 extracts two signal sequences #1 and #2 of a length adding the CP length and the SP length from Sp #1 and Sp #2 as the starting points. Two extracted signal sequences #1 and #2 are made pilot blocks SB #1 and SB #2 with CPs attached to their heads. That is, according to the preset embodiment, as in pilot generation example 1, it is equally possible to acquire pilot blocks SB #1 and SB #2 with CPs attached to their heads.

Figure 17:
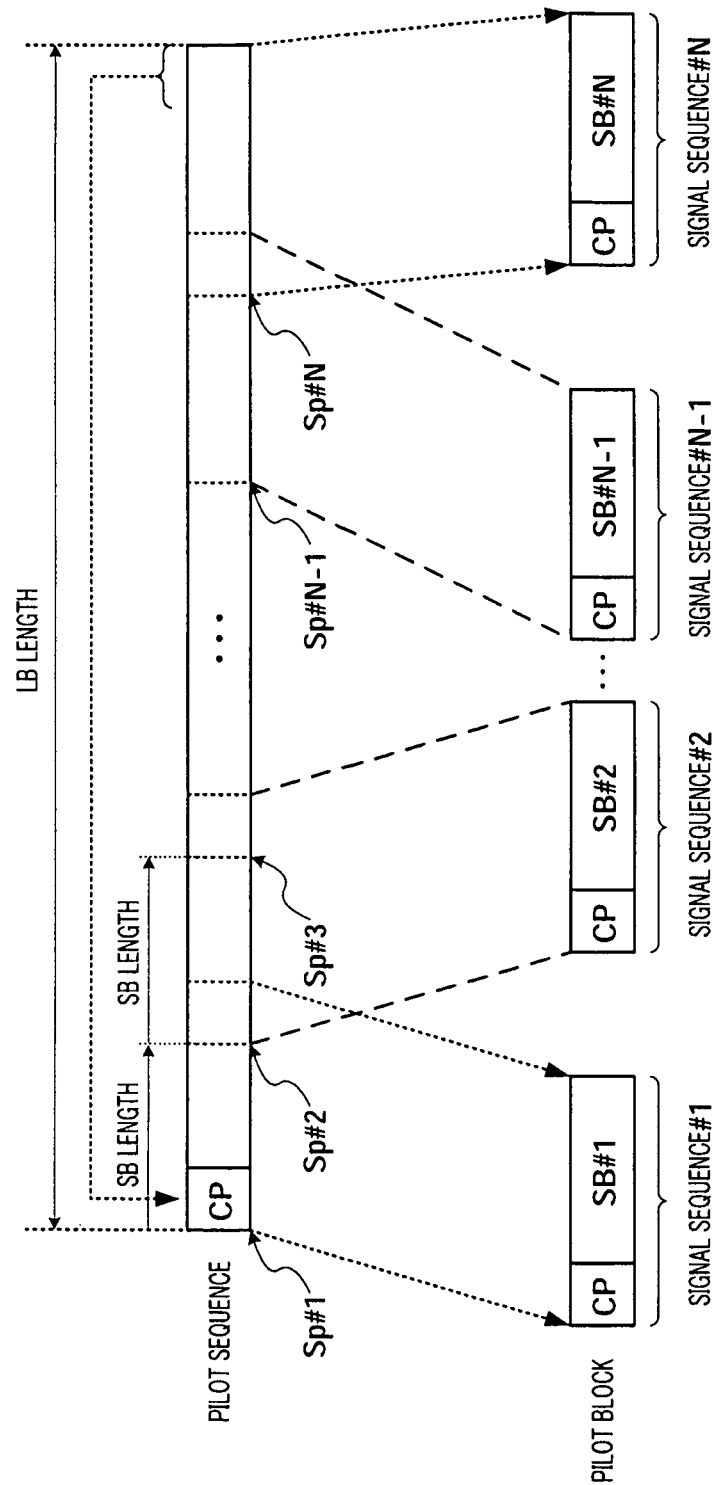
FIG. 17 shows a case where a plurality of SB-length pilot blocks are extracted from a single LB-length pilot sequence.

Further, FIG. 17 shows a case where a plurality (N) of SB-length pilot blocks are extracted from a single LB-length pilot sequence.

That is, CP attaching section 153 generates a signal sequence in which the tail end portion of an inputted LB-length pilot sequence is attached to its head. Extracting section 154 determines the head of the signal sequence as point Sp #1, and determines positions of SB-length intervals from the head as starting points Sp #2 to Sp #N in order. Further, extracting section 154 extracts N signal sequences of a length adding the CP length and the SB-length from Sp #1 to Sp #N as the starting points. N extracted signal sequences represent pilot blocks SB #1 to SB #N with CPs attached to their heads.

Two pilot generation examples have been explained above.

Further, according to the transmission format in the uplink in 3GPP RAN LTE shown in FIG. 2, pilot blocks generated as above are multiplexed with data blocks in multiplexing section 106 and outputted via transmission antenna 108.

Figure 18:
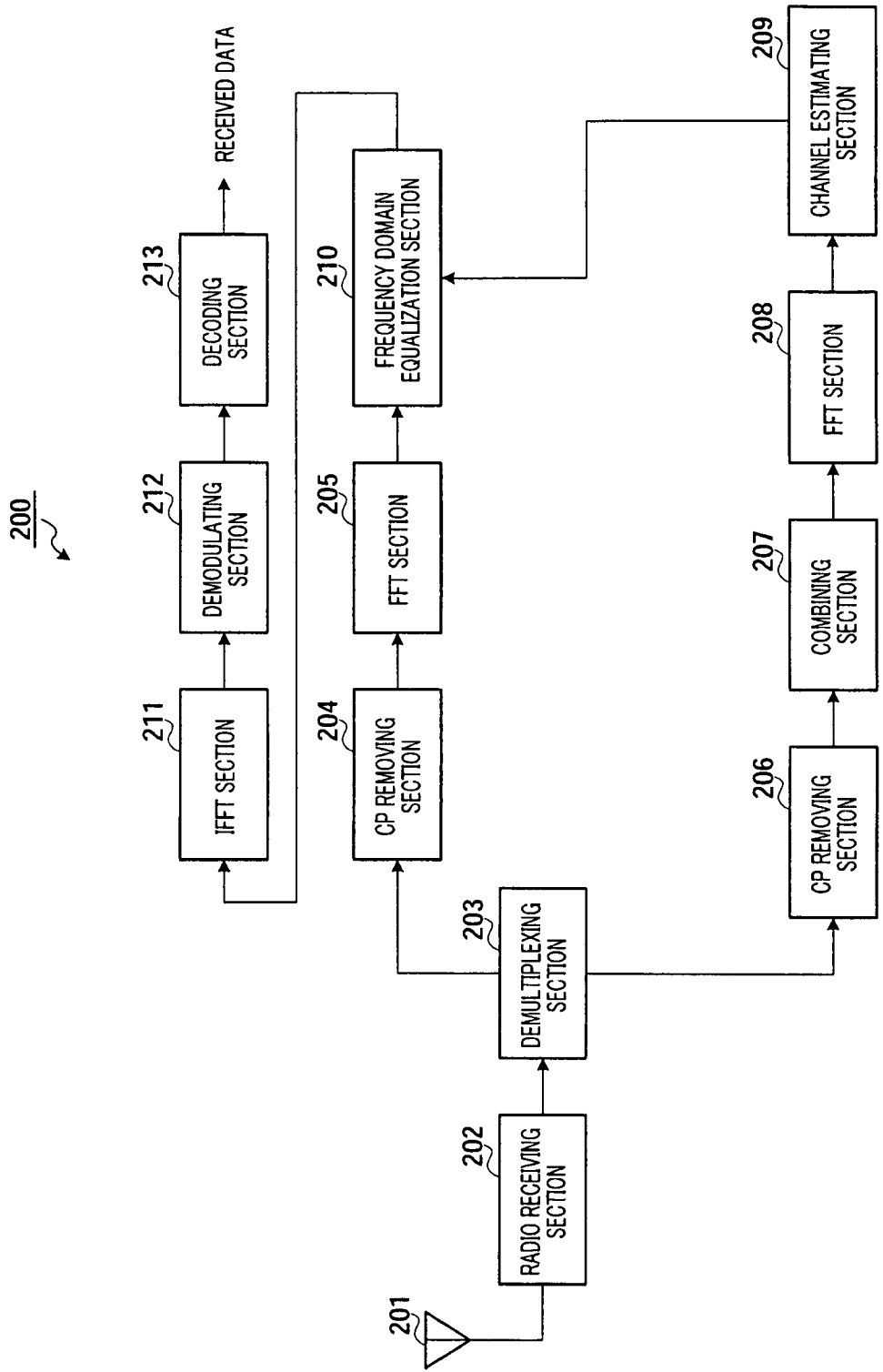
FIG. 18 is a block diagram showing a configuration of a radio receiving apparatus according to Embodiment 1 of the present invention.

Next, radio receiving section 200 that receives a multiplexed signal transmitted from radio transmitting apparatus 100 shown in FIG. 11, will be explained. FIG. 18 is a block diagram showing the configuration of radio receiving apparatus 200 according to the present embodiment.

Radio receiving section 202 receives a multiplexed signal transmitted from radio transmitting apparatus 100 via receiving antenna 201, performs radio receiving processing such as down-conversion and A/D conversion for the received signal and outputs it to demultiplexing section 203.

Demultiplexing section 203 demultiplexes the multiplexed signal into the data blocks (LB #1 to LB #6) with CPs attached to their heads and the pilot blocks SB #1 and SB #2) with CPs attached to their heads according to the transmission format shown in FIG. 2, outputs the data blocks to CP removing section 204 and outputs the pilot blocks to CP removing section 206.

CP removing section 204 removes the CP attached to the head of the direct wave of data block based on the synchronization timing, and outputs the resulting LB-length data sequence to FFT section 205.

FFT section 205 performs FFT processing on the LB-length data sequence and outputs a plurality of frequency components of the data sequence to frequency domain equalization section 210.

On the other hand, CP removing section 206 removes the CP attached to the head of the direct wave of pilot block and outputs the result to combining section 207.

Combining section 207 combines a plurality of SB-length pilot blocks (here, two pilot blocks SB #1 and SB #2) to generate an LB-length pilot sequence and outputs the generated LB-length pilot sequence to FFT section 208.

FFT section 208 performs FFT processing on the LB-length pilot sequence and outputs a plurality of frequency components of the pilot sequence to channel estimating section 209.

Channel estimating section 209 calculates the frequency response of the channel in each frequency component by dividing the frequency component of the standard pilot sequence by the frequency component of the pilot sequence inputted from FFT section 208, and outputs the calculated frequency responses to frequency domain equalization section 210 as channel estimation values.

Frequency domain equalization section 210 compensates the distortion caused by the influence of fading or multipath by equalizing the frequency components of the data sequence in the frequency domain using the channel estimation values inputted from channel estimating section 209, and outputs the results to IFFT (Inverse Fast Fourier Transform) section 211.

IFFT section 211 performs IFFT processing on the data sequence after frequency domain equalization to convert the data sequence divided into the frequency components, into a time domain data sequence, and outputs the data sequence to demodulating section 212.

Demodulating section 212 performs demodulation processing on the time domain data sequence and outputs the result to decoding section 213.

Decoding section 213 performs error correcting such as turbo decoding for the demodulated data sequence and acquires received data.

As described above, in a series of a plurality of pilot blocks generated from a single pilot sequence in radio transmitting apparatus 100, the tail end portions of pilot blocks are cyclically made the CPs of different pilot blocks, so that delay waves of the pilot sequence acquired in radio receiving apparatus 200 are consecutive. Therefore, by performing FFT processing, frequency domain equalization processing and demodulation processing using this pilot sequence, it is possible to prevent the deterioration of the accuracy of channel estimation and the degradation of received performances.

Further, radio transmitting apparatus 100 transmits a plurality of pilot blocks in one subframe, so that radio receiving apparatus 200 can receive signals in response to the fading fluctuation in the time domain.

Further, radio transmitting apparatus 100 generates a series of a plurality of SB-length pilot blocks from a single pilot sequence and transmits the results to radio receiving apparatus 200, and radio receiving apparatus 200 performs frequency domain equalization using the pilot sequence acquired by combining the plurality of received pilot blocks. Thus, according to the present embodiment, it is possible to make the pilot sequence length closer to the data block length while increasing the pilot sequence length without changing the number of pilot blocks included in one subframe and the pilot block length (i.e., without deteriorating the data transmission rate). Therefore, it is possible to make the subcarrier intervals in the pilot sequence closer to the subcarrier intervals in the data sequence, thereby improving the accuracy of channel estimation value interpolation in the frequency domain in radio receiving apparatus 200.

Further, by coordinating the pilot sequence length with the data block length, it is possible to make equal the subcarrier interval in the pilot sequence and the subcarrier interval in the data sequence. Consequently, it is possible to apply channel estimation values calculated in the subcarrier intervals in the pilot sequence, to the data sequence. Therefore, by coordinating the pilot sequence length with the data block length, channel estimation values need not be interpolated in the frequency domain, so that it is possible to further improve received performances.

Thus, according to the present embodiment, it is possible to improve the accuracy of channel estimation and received performances.

Further, although a case has been described with the present embodiment where, in a series of a plurality of pilot blocks generated from a single pilot sequence, the tail end portions of pilot blocks are cyclically made CPs of different pilot blocks, it is equally possible to apply the CP attaching method of the present embodiment to the data sequence. In this case, in a series of a plurality of data blocks generated from a single data sequence, it is equally possible to cyclically make the tail end portions of data blocks the CPs of the different data blocks.

Further, a case has been explained with the present embodiment where a series of a plurality of pilot blocks generated from a single pilot sequence are mapped on one subframe, the present invention is not limited to this, and it is equally possible to map the above-noted series of a plurality of pilot blocks over a plurality of subframes.

(Embodiment 2)

In the present embodiment, as a pilot sequence, cyclic-shift-based CAZAC (Constant Amplitude Zero Auto-Correlation) sequences generated by cyclically shifting a CAZAC sequence, are used. A plurality of cyclic-shift-based CAZAC sequences generated from a single CAZAC sequence are assigned to a plurality of radio transmitting apparatuses, respectively.

Here, features of the CAZAC sequence include high autocorrelation characteristics. Further, there is no mutual correlation between cyclic-shift-based CAZAC sequences acquired by shifting the same CAZAC sequence. Therefore, by using the cyclic-shift-based CAZAC sequence as the pilot sequence, it is possible to multiplex and transmit a plurality of pilot sequences while suppressing the interference between pilot sequences from a plurality of radio transmitting apparatuses.

On the other hand, if the number of required multiplexes (i.e., the number of radio transmitting apparatuses that transmit pilot sequences at the same time) is greater than the number of cyclic-shift-based CAZAC sequences acquired from the same CAZAC sequence, a plurality of different CAZAC sequences need to be used.

However, between CAZAC sequences deriving cyclic-shift-based CAZAC sequences, although the mutual correlation is relatively small, the CAZAC sequences are not completely orthogonal to each other. Consequently, it is preferable to increase the length of the CAZAC sequence and increase the number of cyclic-shift-based CAZAC sequences acquired from a single CAZAC sequence.

Therefore, according to the present embodiment, the pilot generation method of Embodiment 1 is applied to the CAZAC sequence as shown below.

Figure 19:
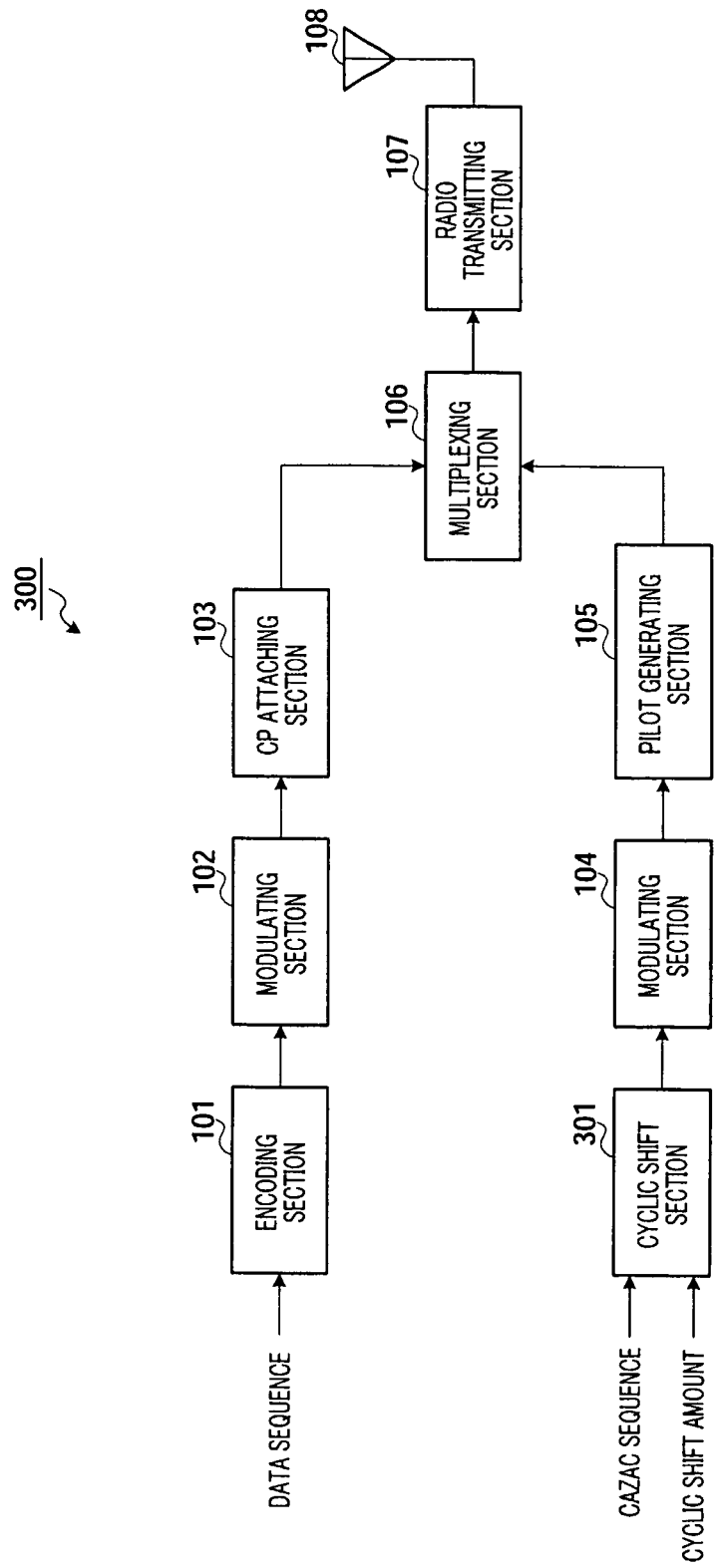
FIG. 19 is a block diagram showing a configuration of a radio transmitting apparatus according to Embodiment 2 of the present invention.

FIG. 19 is a block diagram showing the configuration of radio transmitting apparatus 300 according to Embodiment 2 of the present invention. Radio transmitting apparatus 300 has the same basic configuration as radio transmitting apparatus 100 (see FIG. 11) shown in Embodiment 1, and therefore the same components will be assigned the same reference numerals and detailed explanations will be omitted.

Radio transmitting apparatus 300 is different from radio transmitting apparatus 100 in providing cyclic shift section 301.

Cyclic shift section 301 receives as input an LB-length CAZAC sequence and the cyclic shift amount, generates a plurality of LB-length cyclic-shift-based CAZAC sequences by cyclically shifting the LB-length CAZAC sequence per cyclic shift amount, and outputs the generated cyclic-shift-based CAZAC sequences to modulating section 104 as pilot sequences.

Figure 20:
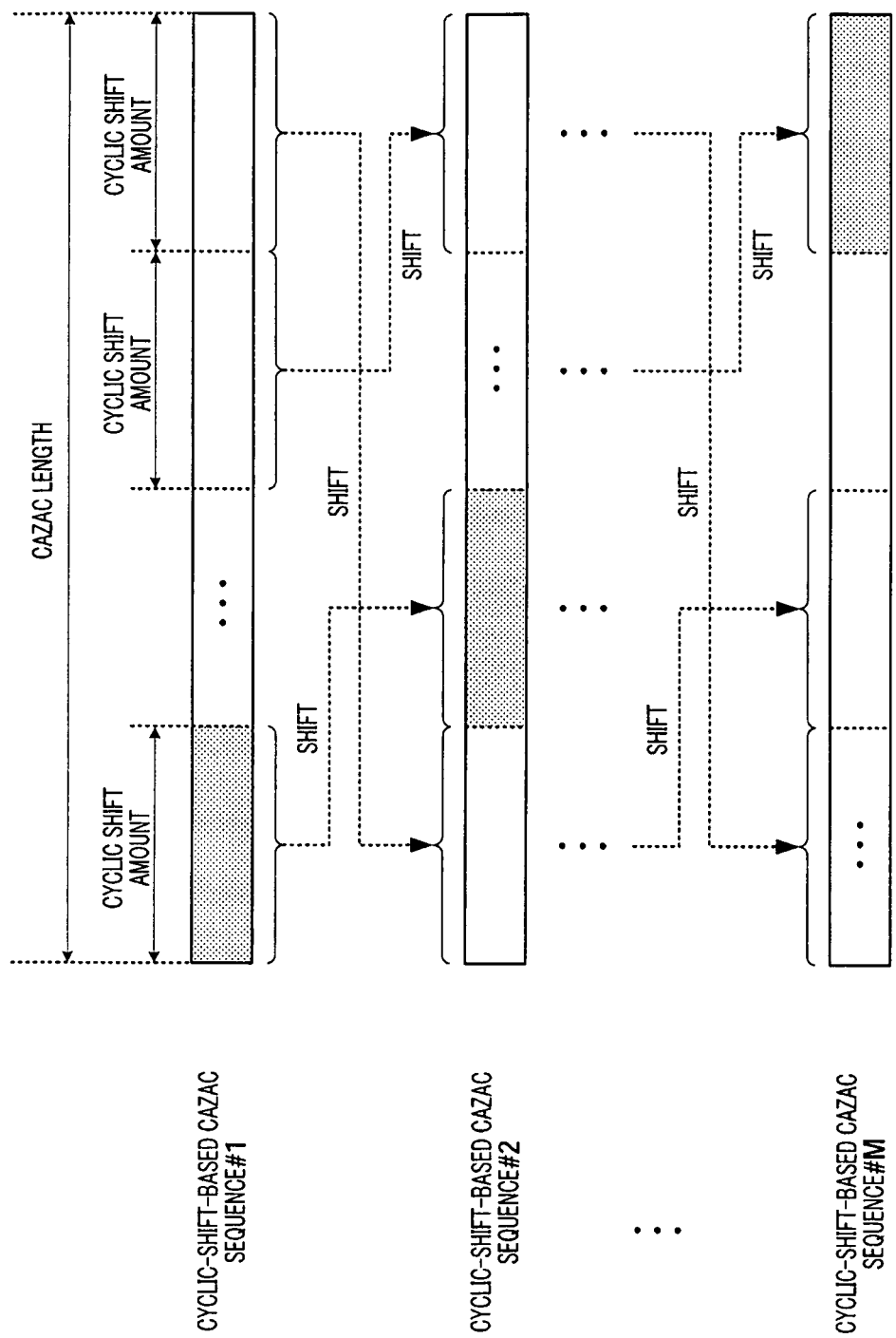
FIG. 20 illustrates an operation of a cyclic shift section according to Embodiment 2 of the present invention.

FIG. 20 illustrates the operations of cyclic shift section 301. Here, the cyclic shift amount is a predetermined value determined in advance upon the system design. To be more specific, the cyclic shift amount is determined by the maximum delay time at which a signal transmitted from radio transmitting apparatus 300 reaches the radio receiving apparatus. The number of cyclic-shift-based CAZAC sequences generated from a single CAZAC sequence, M, is calculated according to following equation 1.

$$M = \text{CAZAC length/cyclic shift amount} \quad \text{(Equation 1)}$$

As shown in FIG. 20, cyclic shift section 301 generates M cyclic-shift-based CAZAC sequences by cyclically shifting the CAZAC sequence of the same CAZA length per cyclic shift amount. All of the M LB-length cyclic-shift-based CAZAC sequences generated from the CAZAC sequence of the same LB-length are orthogonal to each other. That is, the mutual correlation value between cyclic-shift-based CAZAC sequence #1, cyclic-shift-based CAZAC sequence #2, . . . , cyclic-shift-based CAZAC sequence #M, is zero. Therefore, when pilot sequences from a plurality (less than M) of radio transmitting apparatuses 300 are multiplexed using the M LB-length cyclic-shift-based CAZAC sequences as pilot sequences, it is possible to reduce inter-code interference between pilot sequences, thereby improving receiving performance of the radio receiving apparatus.

Figure 21A:
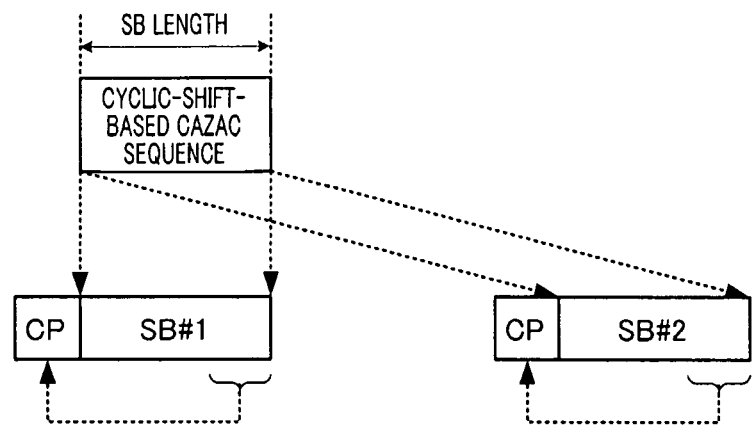
FIG. 21 illustrates an advantageous effect of Embodiment 2 of the present invention compared to conventional techniques.
Figure 21B:
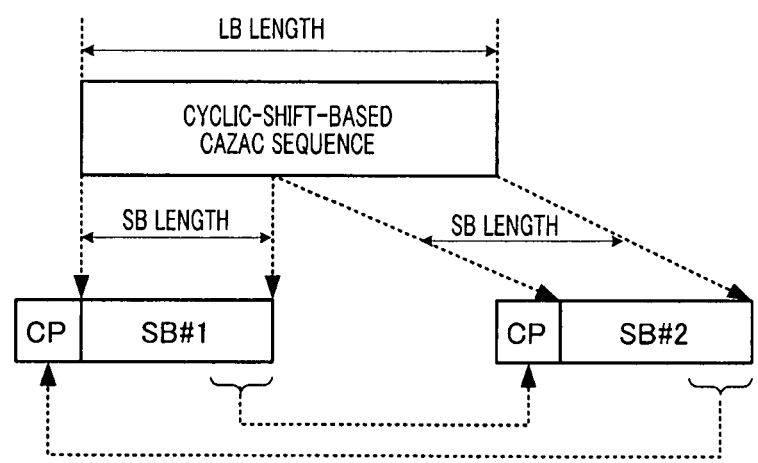

FIG. 21 illustrates an advantageous effect of the present embodiment. FIG. 21A shows a case where SB-length pilot blocks are generated from an SB-length cyclic-shift-based CAZAC sequence. FIG. 21B shows a case where, in the present embodiment, the pilot generation method of Embodiment 1 is applied to the CAZAC sequence and SB-length pilot blocks are generated from an LB-length cyclic-shift-based CAZAC sequence. In the present embodiment, a plurality of SB-length pilot blocks can be generated from a single LB-length cyclic-shift-based CAZAC sequence and transmitted, so that it is possible to use a longer LB-length CAZAC sequence as the pilot sequence. Therefore, according to the present embodiment, the number of cyclic-shift-based CAZAC sequences calculated according to above-noted equation 1 becomes larger, so that it is possible to multiplex more pilot sequences comprised of cyclic-shift-based CAZAC sequences.

As described above, according to the present embodiment, by using cyclic-shift-based CAZAC sequences generated from a longer CAZAC sequence as pilot sequences, it is possible to reduce interference between pilot sequences, and multiplex more pilot sequences from radio transmitting apparatuses.

Figure 22A:
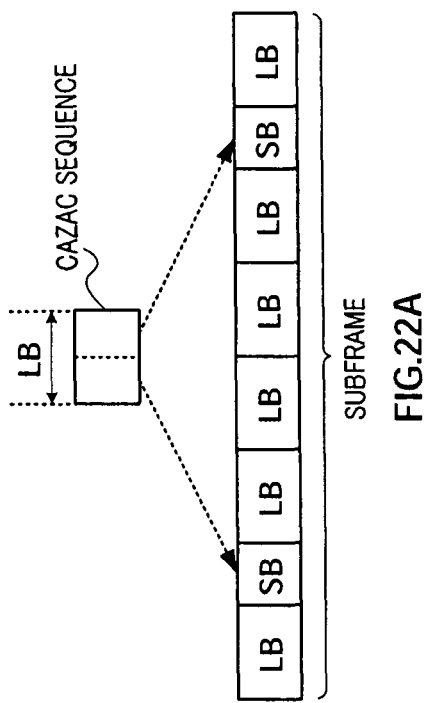
FIG. 22 illustrates the number of multiplications upon using a two-LB-length CAZAC sequence.
Figure 22B:
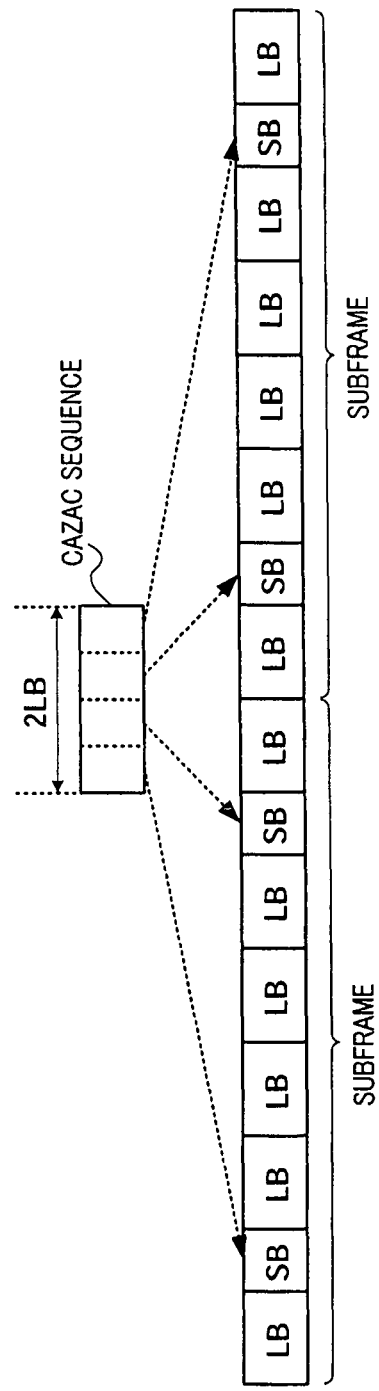

Further, although a case has been described above with the present embodiment where a series of a plurality of pilot blocks generated from a single cyclic-shift-based CAZAC sequence are mapped to one subframe and transmitted, it is equally possible to map and transmit the above-noted series of a plurality of pilot blocks over a plurality of subframes. By this means, it is possible to use a longer CAZAC sequence and multiplex more pilot sequences from radio transmitting apparatuses. FIG. 22A shows a case where a series of two SB-length pilot blocks generated from a single LB-length CAZAC sequence are mapped in one subframe, and FIG. 22B shows a case where a series of four SB-length pilot blocks generated from a single two-LB-length CAZAC sequence are mapped over two subframes. In FIG. 22B, a series of a plurality of pilot blocks generated from a single cyclic-shift-based CAZAC sequence are mapped over two subframes. By this means, it is possible to make the length of cyclic-shift-based CAZAC sequence twice as long as in FIG. 22A, and multiplex twice the number of pilot sequences from radio transmitting apparatuses as in FIG. 22A.

Further, an example case has been explained with the present embodiment where a cyclic-shift-based CAZAC sequence is used as a pilot sequence, the present invention is not limited to this, and, for example, it is equally possible to use a cyclic-shift-based Walsh sequence as a pilot sequence. Cyclic-shift-based Walsh sequences can be acquired by shifting the same Walsh sequence, as with the CAZAC sequence. Further, as with the CAZAC sequence, the Walsh sequence has high autocorrelation characteristics. Further, although the mutual correlation is zero between cyclic-shift-based Walsh sequences acquired by shifting an identical Walsh sequence, the mutual correlation between Walsh sequences deriving cyclic-shift-based CAZAC sequences is relatively little but is not zero. Therefore, in the present embodiment, even if the Walsh sequence is used instead of the CAZAC sequence, it is equally possible to realize the above-noted operation and effect.

(Embodiment 3)

Figure 23:
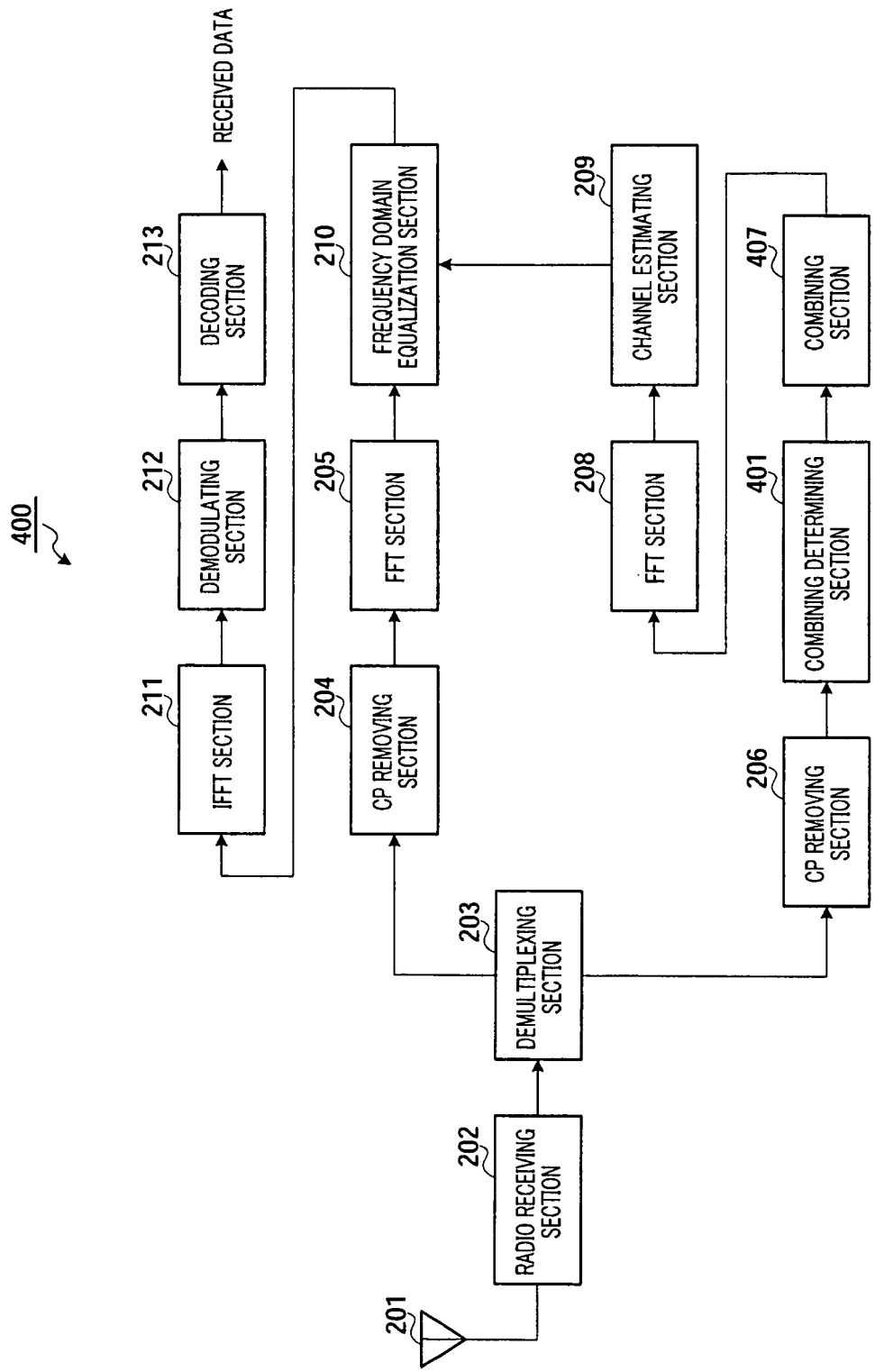
FIG. 23 is a block diagram showing a configuration of a radio receiving apparatus according to Embodiment 3 of the present invention.

FIG. 23 is a block diagram showing the configuration of radio receiving apparatus 400 according to Embodiment 3 of the present invention. Radio receiving apparatus 400 has the same basic configuration as radio receiving apparatus 200 (see FIG. 18) shown in Embodiment 1, and therefore the same components will be assigned the same reference numerals and explanations will be omitted.

Radio receiving apparatus 400 is different from radio receiving apparatus 200 in providing combining determining section 401. Further, combining section 407 of radio receiving apparatus 400 and combining section 207 of radio receiving apparatus 200 are different in part of processing, and therefore are assigned different reference numerals.

Combining determining section 401 estimates the maximum Doppler frequency using a pilot block inputted from CP removing section 206 and determines based on the estimated maximum Doppler frequency, whether combining processing of pilot blocks are performed in combining section 407. Combining determining section 401 estimates the maximum Doppler frequency based on the phase fluctuation amount per predetermined frequency of the pilot block. Further, when the maximum Doppler frequency is equal to or greater than a threshold, for example, 200 Hz, combining determining section 401 determines not to perform combining processing of pilot blocks in combining section 407, and, when the maximum Doppler frequency is less than the threshold, for example, 200 Hz, determines to perform combining processing of pilot blocks in combining section 407. Combining determining section 401 outputs the combining determination result (i.e., "0" in the case of not performing combining processing, "1" in the case of performing combining processing) and pilot blocks inputted from CP removing section 206 to combining section 207.

If the combining determination result inputted from combining determining section 401 shows "1," combining section 407 combines the plurality of pilot blocks inputted from combining determining section 401 to generate a pilot sequence, and outputs the generated pilot sequence to FFT section 208. By contrast, if the combining determination result inputted from combining determining section 401 shows "0," combining section 407 does not combine the plurality of pilot blocks inputted from combining determining section 401 and directly outputs these pilot blocks to FFT section 208.

As described above, according to the present embodiment, the method of channel estimation can be switched according to the propagation environment without changing the transmission format, so that it is possible to improve the accuracy of channel estimation. That is, when the maximum Doppler frequency is equal to or greater than a threshold, it is possible to follow time fading fluctuation by performing channel estimation using pilot blocks before combining, and, when the maximum Doppler frequency is less than the threshold, it is possible to make equal the subcarrier interval in a pilot and the subcarrier interval in data by performing channel estimation using a pilot sequence after combining.

Embodiments of the present invention have been explained above.

Further, the radio transmitting apparatus according to the present invention can be included in a communication terminal apparatus in mobile communication systems and the radio receiving apparatus according to the present invention can be included in a base station apparatus in mobile communication systems. By this means, it is possible to provide a communication terminal apparatus, base station apparatus and mobile communication systems having the same operational effect as above.

Further, the subframe used in the above explanations may be other transmission time units such as a time slot and frame. Further, the CP used in the above explanations may be referred to as a guard interval ("GI"). Further, a base station may be referred to as "Node B," and a communication apparatus may be referred to as "mobile station apparatus" or "UE."

Although a case has been described with the above embodiments as an example where the present invention is implemented with hardware, the present invention can be implemented with software. For example, by describing the pilot generation method according to the present invention in a programming language, storing this program in a memory and making the information processing section execute this program, it is possible to implement the same function as the radio transmitting apparatus of the present invention.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-174485, filed on Jun. 23, 2006, including the specification, drawings and abstract, is incorporated herein by reference in its entirety.

INDUSTRIAL APPLICABILITY

The radio transmitting apparatus, radio receiving apparatus and pilot generation method according to the present invention is applicable to radio communication such as frequency domain equalization.

The invention claimed is:

1. A radio reception apparatus comprising:
a receiver configured to receive a series of a plurality of data blocks, each of which has a cyclic prefix;
a generator configured to remove the cyclic prefix from each of the plurality of data blocks, and generate a data sequence by combining a tail end of each of the plurality of data blocks to a beginning of another data block following the each of the data blocks; and
a channel estimation section configured to perform a channel estimation using the data sequence after combining,
wherein the series of the plurality of data blocks are generated by dividing the single data sequence into the series of the plurality of data blocks and cyclically adding a tail end portion of each of the data blocks to a beginning portion of another data block following the each of the data blocks as the cyclic prefix, and
wherein, when a maximum Doppler frequency is equal to or greater than a threshold, the channel estimation section performs the channel estimation using the data blocks before combining, and, when the maximum Doppler frequency is less than the threshold, performs the channel estimation using the data sequence after combining.

2. A radio communication base station apparatus comprising the radio reception apparatus according to claim 1.

* * * * *